Jan. 21, 1930. H. C. FRAZIER 1,744,538
HOOK
Filed Jan. 7, 1929 2 Sheets-Sheet 1
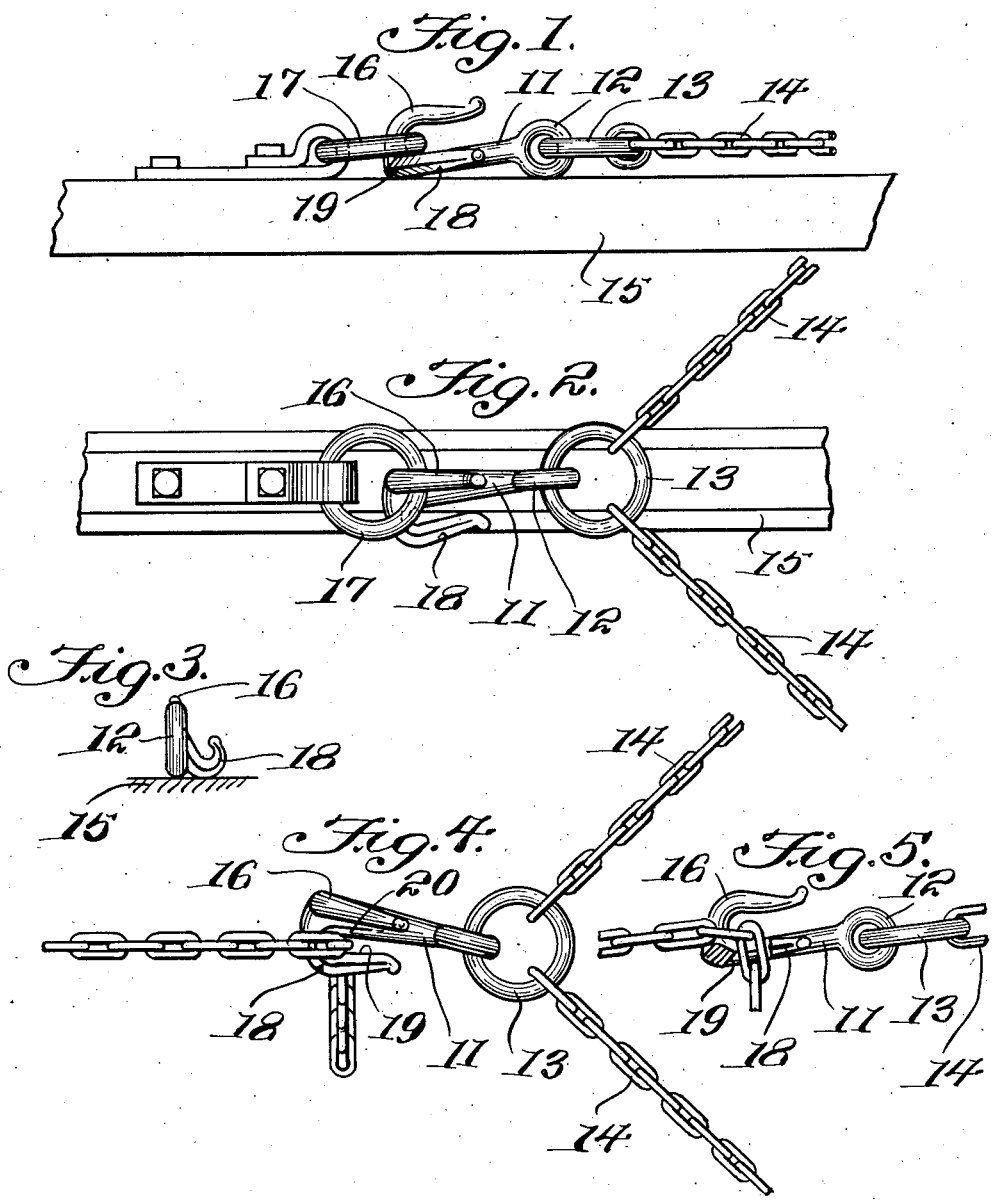

Jan. 21, 1930.  H. C. FRAZIER  1,744,538
HOOK
Filed Jan. 7, 1929   2 Sheets-Sheet 2
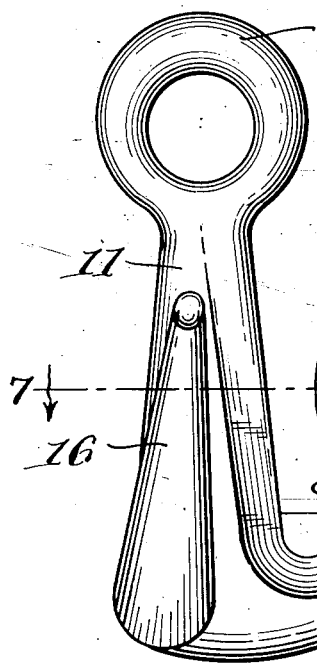
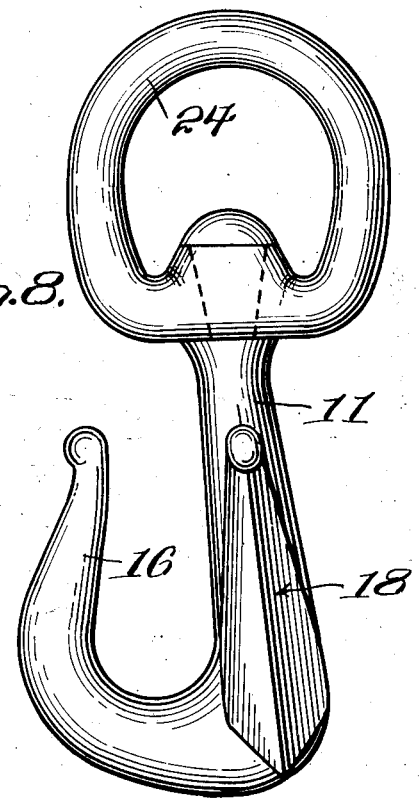
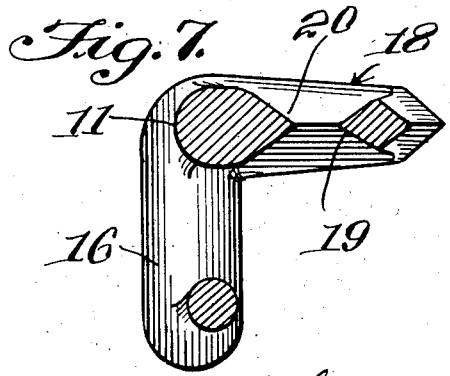
Harmon C. Frazier
INVENTOR
BY Victor J. Evans
ATTORNEY
WITNESS: G. S. L. Wright Patented Jan. 21, 1930

1,744,538

UNITED STATES PATENT OFFICE

HARMON C. FRAZIER, OF MARTIN, TENNESSEE

HOOK

Application filed January 7, 1929. Serial No. 330,914.

This invention relates to hooks and has for an object the provision of a multiple bill hook which is especially adapted for use as a logger's stretcher hook, so that a single hook may take the place of two separate hooks, or of two separate pairs of logger's stretchers.

Another object of the invention is the provision of a hook which may be used as a part of a wagon draft gear and may also be used as a catch or grab hook, the construction of the hook permitting it to engage the ring of a wagon tongue and lie flat upon the tongue, or readily detached and used in loading logs, and for other work.

With the above and other objects in view, the invention further includes the following novel features and details of construction, to be hereinafter more fully described, illustrated in the accompanying drawings and pointed out in the appended claim.

In the drawings:—

Figure 1 is a side elevation showing a portion of a wagon tongue and illustrating one use of the invention.

Figure 2 is a top plan view of the same.

Figure 3 is an end view of the hook.

Figure 4 is a top plan view showing another use of the invention.

Figure 5 is a fragmentary side view partly broken away showing the hook used after the manner shown in Figure 4.

Figure 6 is an enlarged elevation of a hook with a different arrangement of eye.

Figure 7 is a section on the line 7—7 of Figure 6.

Figure 8 shows an elevation of a hook having a swiveled eye for use in snaking logs.

Figure 9 is a fragmentary view showing still another form of eye.

Figure 10 is a detail section on the line 10—10 of Figure 9.

Referring to the drawings in detail wherein like characters of reference denote corresponding parts, the hook as shown comprises a shank 11 having an eye 12 at one end to engage the ring 13 which connects the chains 14 of a doubletree so that the hook may form a portion of the draft gear of a wagon or the like.

In order to connect the chains 14 of the stretcher (not shown) to the tongue 15 of a wagon, the hook is provided with a bill 16. This bill is preferably round in contour and is so spaced from the shank 11 as to be readily engaged with or disengaged from the ring 17 of the wagon tongue.

The purpose of this ready disengagement of the hook from the wagon tongue is to permit of the hook being engaged with the chain for hauling or dragging logs, and for like work. Heretofore, two hooks have been connected with the stretcher ring and one of these hooks is constructed to engage the ring 17 while the other hook is constructed so as to be engaged with the chain. The objection to this however is that one of the hooks will hang downward and be in the way. An old method is to provide two separate loggers' stretchers, one for engagement with a wagon tongue ring and the other to be engaged by a chain.

These and other disadvantages are overcome in the present invention by providing the shank with an additional bill 18. This bill lies relatively close to the shank and the portion opposed to the shank is angular as shown at 19 while the opposed portion of the shank is also angular as shown at 20, so that a chain dropped into the space between the shank and the bill 18 will be tightly gripped.

The bill 18 is arranged substantially at right angles with respect to the bill 16, so that when the bill 16 is in use, the bill 18 will lie flat upon the wagon tongue and out of the way.

The eye 12 may be ararnged as shown in Figures 1, 2 and 3 of the drawings, or it may be arranged as indicated at 21 in Figure 6 so as to lie flat instead of stand upright as shown in Figures 1, 2 and 3. If desired, the eye 22 shown in Figure 9 of the drawings may be provided with a loose ring or grummet 23 so as to prevent wear when the hook is attached to a rope or cable.

If desired, the hook may be provided with a swiveled eye as shown at 24 in Figure 8 of the drawing which renders the hook convenient for use on snaking tongs used by loggers and timber workers and others.

While the invention is shown and described as a logger's stretcher hook it is obvious that it may be used for many other purposes. It may be used by timber workers, steel workers, bridge builders, road builders, railroads and construction companies, in fact it may be used advantageously anywhere that a double circle and grap hook would be useful, as it combines both of these features.

The invention is susceptible of various changes in its form, proportions and minor details of construction and the right is herein reserved to make such changes as properly fall within the scope of the appended claim.

Having described the invention what is claimed is:

In a hook, a flat shank, and bills extending from one end of the shank defining hooks arranged substantially at right angles to one another and adapted to lie flat upon a wagon tongue with the open ends of the hooks disposed in the same direction, one of said bills being relatively close to the shank, and opposed angular edges for the last referred to bill and shank.

In testimony whereof I affix my signature.

HARMON C. FRAZIER.